United States Patent [19]
Mayer et al.

[11] 4,094,594
[45] June 13, 1978

[54] MOVIE-CAMERA WITH AUTOMATIC FADE-OUT SHUTOFF

[75] Inventors: Hermann Mayer, Esslingen; Hans-Friedrich Kiefer, Stuttgart, both of Germany

[73] Assignee: Robert Bosch GmbH, Stuttgart, Germany

[21] Appl. No.: 675,808

[22] Filed: Apr. 12, 1976

[30] Foreign Application Priority Data

Apr. 25, 1975   Germany ............................. 2518369

[51] Int. Cl.² ............................................. G03B 21/36
[52] U.S. Cl. ................................... 352/91 C; 352/141
[58] Field of Search ................. 352/91 R, 91 C, 91 S, 352/141, 217

[56] References Cited

U.S. PATENT DOCUMENTS 3,712,721  1/1973  Keiner .................................. 352/91 S
3,792,920  2/1974  Mayr .................................... 352/91 S Primary Examiner—Monroe H. Hayes
Attorney, Agent, or Firm—Michael J. Striker

[57] ABSTRACT

A movie camera has a film advance motor which can only operate when a relay is closed that is controlled by a transistor. This transistor can be operated by the release switch of the camera and by a circuit which senses the end of a fade-out cycle so that the film-advance motor is automatically stopped at the end of the fade-out cycle. To this end a variable diaphragm, which is provided with automatic light-adjusting circuitry is operated by a driving coil adjacent which is provided a damping coil that causes a control circuit to change the level of an output signal when the diaphragm aperture is fully closed so that at this time the film-advance motor is automatically stopped.

10 Claims, 1 Drawing Figure

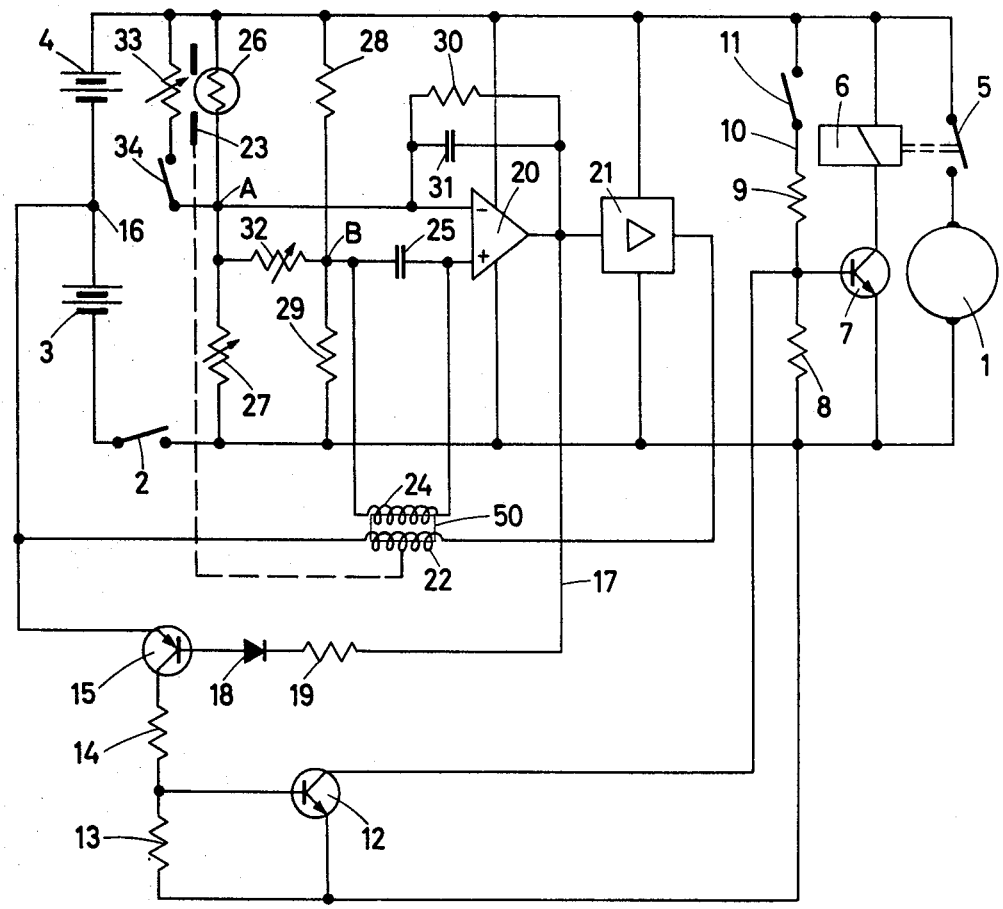

MOVIE-CAMERA WITH AUTOMATIC FADE-OUT SHUTOFF

BACKGROUND OF THE INVENTION

The present invention relates to a motion-picture camera. More particularly, this invention concerns such a camera provided with an automatic fade out.

In a motion picture camera the film is usually advanced by an electric motor that is connected across a power supply by means of a release switch that is closed when film is to be exposed. This switch is, for example provided as a trigger on a grip of the camera.

It is also known in such devices to provide an automatic exposure control, normally comprised of a photosensitive element provided in the camera behind the diaphragm and connected to an electric drive mechanism that increases the lens or diaphragm aperture when insufficient light is falling on it and decreases when too much light is falling on it. Such an automatic control is set for the exposure time, which is typically the same in movie cameras, and the ASA or DIN rating of the film.

It is also known to provide such a camera with a circuit making it possible to fade in, that is to increase the lens or diaphragm aperture from a fully closed setting to the proper setting for the given light, and to fade out, that is to close the aperture down from the appropriate setting for the given light to the fully closed position. This type of arrangement makes it possible, therefore, to start and end a particular filming sequence in a manner resembling that in professional motion pictures so that abrupt changes in scene are avoided. Cameras equipped with such a feature have a fade-out button that is separate from the above-mentioned trigger that serves to start the exposure of the film. Thus, the user actuates the fade-out button at the end of a scene and when he or she feels that fade-out sequence is over, the trigger is released.

Such an arrangement has the considerable disadvantage that the user cannot exactly ascertain when the fade-out sequence is completed and he or she cannot know exactly when to stop the film advance. Thus, at certain times film is wasted when the film advance is stopped too late, and at other times the fade out is not given time to complete. One attempt has been suggested to overcome this disadvantage by providing a timer in the device that automatically stops the film advance at the end of the fade-out sequence. Such an arrangement considerably reduces wastage of film, but nonetheless has the considerably disadvantage that it increases the cost of the camera and still does not exactly stop the film transport when the fade-out sequence is finished. A simple aging of the components, temperature, or other variables may cause the time constant of the stop circuit to become shorter or longer so that either film is wasted, or the fade-out sequence is not allowed to terminate completely.

SUMMARY OF THE INVENTION

It is therefore an object of the present invention to provide an improved movie camera.

Another object is the provision of such a camera which overcomes the above-given disadvantages.

These objects are attained according to the present invention in a movie camera of the above-described general type which is provided with circuit means connected between the fade control and the switch that operates the film-advance motor for detecting the aperture size and opening the motor-control switch when the aperture is closed after fade out. With this system, therefore, the film-advance motor is stopped exactly at the end of the fade-out cycle. Since there is no independent time constant controlling this stoppage, premature or late stopping of the motor is completely avoided.

According to another feature of this invention the fade means includes a drive coil connected to a variable lens diaphragm for opening and closing it and a damping coil adjacent the drive coil for generating a voltage in response to variations of the lens aperture. Only when this damping coil ascertains that the diaphragm is closed and not moving the necessary output signal is fed to the relay constituting the motor-control switch to open-circuit the motor and stop it.

An exposure control system, having a drive or energizing coil and a damping coil is shown for example in the U.S. Pat. No. 3,461,786 of TAKAYOSHI SATO ET AL.

According to further features of this invention a transistor circuit is used whose last stage is a transistor across whose output is connected the switching relay for the film advance motor. This last transistor is normally conductive but is rendered non-conductive when the diaphragm aperture is fully closed after a fade-out.

In accordance with a further feature of this invention the camera is provided with an automatic diaphragm control comprising a photo-sensitive element connected in a bridge circuit across the input of a differential amplifier whose output serves to operate the diaphragm servomotor. Such circuitry can very easily be integrated right into the normal diaphragm-control circuit so that the fabrication cost of the camera is not increased by this automatic fade-out shut-off feature.

The novel features which are considered as characteristic for the invention are set forth in particular in the appended claims. The invention itself, however, both as to its construction and its method of operation, together with additional objects and advantages thereof, will be best understood from the following description of specific embodiment when read in connection with the accompanying drawings.

BRIEF DESCRIPTION OF THE DRAWING

The sole FIGURE of the drawing shows a schematic circuit diagram of the system according to the present invention.

DESCRIPTION OF THE PREFERRED EMBODIMENT

The camera whose control circuitry is shown in FIG. 1 has a film-advance motor 1 that is coupled to a film transporting claw (not shown) which advances the film past the lens of the camera behind the diaphragm thereof. This motor 1 is connectable across a power supply constituted by a pair of series-connected batteries 3 and 4. An on-off switch 2 is provided to completely shut down the system, and a contact 5 of a relay 6 is also provided in series with the motor 1 for starting and stopping this motor.

The relay 6 is connected on one side to the power supply 3, 4 and on the other side to the collector of a transistor 7 whose emitter is connected to ground and whose base is connected between a pair of biasing resistors 8 and 9 constituting a voltage divider. The other side of the biasing resistor 9 is connected via a wire 10 to a release switch 11 that is closed to start the motor 1 for advancing film. Thus, the on-off switch 2 is closed when the camera is to be used at all, and the release switch 11 is a momentary-contact push button switch which is only closed during filming.

The base of the transistor 7 is also connected to the collector of a switching transistor 12 having a biasing resistor 13 and connected via another resistor 14 to the collector of yet another transistor 15 whose emitter is connected to a central point 16 between the batteries 3 and 4 and whose base is connected via a line 17 having a diode 18 and resistor 19 to the output of a differential amplifier 20.

The output of this differential amplifier 20 is also connected to a non-linear amplifier stage 21 whose output in turn is connected to a electromagnetic device, which may include a stationary electromagnet 50, a rotatable driving coil 22 connected to a variable lens diaphragm 23 of the camera and a rotatable damping coil for generating a counter voltage. When a current is caused to flow in said driving coil 22, said coil is adapted to be angularly displaced by virtue of the interaction between the magnetic field produced by the driving coil 22 and the magnetic field of the magnet 50. Current flow in one direction will close the diaphragm and a current flow in the opposite direction will open it.

Located directly behind the aperture of the diaphragm 23 is a photoresistor 26 whose resistance is inversely proportional to the amount of light passing through the diaphragm 23 and falling on it. This photoresistor 26 is connected in a Wheatstone bridge across the power supply 3, 4. The other leg of the bridge on the same side is formed by a potentiometer 27 which is variable according to film type. The other side of the bridge is formed by a pair of fixed resistors 28 and 29 so that a pair of take-off nodes A and B are formed. The node A is connected to the inverted negative input of the amplifier 20 and the node B is connected through the parallel-connected damping coil 24 and capacitor 25 to the positive non-inverted input of the amplifier 20. This amplifier 20 is provided with a feedback resistor 30 and a feedback capacitor 31.

The driving coil 22 and the damping coil 24 are wound in such a manner, that they are not magnetically coupled to each other and also that said damping coil 24 is connected in such fashion that the polarity of the induced voltage generated in said coil is opposite to the polarity of the unbalanced voltage generated between the nodes A and B of the Wheatstone bridge.

A potentiometer 32 is connected between the nodes A and B and serves to adjust the strength of the damping signals received from the damping coil 24 whose voltage is opposite that of the coil 22. In addition a switch 24 can connect a potentiometer 33 in parallel across the photoresistor 26. This switch 34 serves to initiate a fade-out sequence. The closing of this switch 34 has the same effect as if a great quantity of light fall on the photoresistor 26.

The above-described circuit functions as follows:

The camera is turned on by closing the switch 2 and filming is commenced by closing the switch 11. This causes the transistor 7 to conduct and the relay 6 to close its contact 5. Thus the motor 1 is connected across the power supply 3, 4 and will advance the film through the camera.

If the light falling on the photoresistor 26 through the diaphragm 23 is the proper quantity for the type of film at the given exposure time the Wheatstone bridge 26–29 will be in balanced state so that no voltage will appear across the nodes A and B. As a result of this no current will flow in the drive coil 22 and the diaphragm 23 will remain in its present position.

Should, however, the amount of light falling on photo-resistor 26 decrease, indicating that the film would be underexposed, the resistance of photoresistor 26 will increase so that the sides 26, 27 of the bridge 26–29 will increase relative to the sides 28, 29. This will cause a positive voltage to appear at the output of the amplifier 20 which will be amplified in turn by the amplifier stage 21 and fed to the driving coil 22. Such positive energization of the coil 22 will rotate the coil in a direction as to open the diaphragm 23 until the bridge 26–29 is balanced and the coil energization is stopped. During this adjustment the PNP transistor 15 has positive voltage on its base so that it is non-conductive and the PNP transistor 12 is similarly non-conductive while the NPN transistor 7 conducts.

Should the light detected by the photoresistor 26, however, exceed the proper value so that the film passing behind the diaphragm 23 would be overexposed the relationship of the resistances 26 and 27 will be smaller than that of the resistances 28 and 29 so that a current will be caused to flow in the coil 22 in the opposite direction. Thus, the diaphragm 23 will be closed down until the bridge 26–29 is again balanced. During such operation, the output of the amplifiers 20 and 21 is a negative voltage which is however due to the counter voltage induced in the damping coil 24 not sufficient to cause the transistor 15 to conduct. The transistor 15 remains therefore non-conductive.

Closure of the switch 34 for a fade-out during normal operation of the camera will connect the resistor 33 in shunt across the photoresistor 26. The balance of the bridge 26–29 is herewith completely upset in such a manner that the camera reacts as if the light falling on the photoresistor were far too much. The output of the amplifiers 20, 21 is therefore a negative voltage. The direction of current flow through the coil 22 is such as to close down the diaphragm 23 at a relatively slow rate. The negative voltage at the output of the amplifier stage 20, 21 is countered by the opposite voltage in the coil 24 so that it does not immediately cause the transistor 15 to conduct. The bridge circuit 26–29 is, however, so imbalanced that it cannot rebalance itself as a result of which the blades of the diaphragm 23 will close this aperature off altogether. Once the aperture is closed completely the coils 22 and 24 come to a standstill. The induced counter voltage in the coil 24 disappears so that the output of the differential amplifier 20 becomes so very negative that the up to now non-conductive transistor 15 is made conductive. Positive voltage therefore appears on the base of the transistor 12 so that this transistor goes into a conductive state and the up to now conductive transistor 7 is made non-conductive. Falling-out of the transistor 7 causes the relay 6 to open and stop the motor 1 instantly. This above-described procedure takes place in very little time so that effectively the motor 1 stops the very instant the diaphragm 23 is fully closed.

Subsequent fading in is possible simply by closing the switch 11 and opening the switch 34. This will cause the bridge 26–29 automatically to rebalance itself as described above, the high negative voltage at the output of the amplifier 21 becoming briefly positive so that the transistors 12 and 15 are again made non-conductive and the transistor 7 conducts to allow operation of the motor 1.

It will be understood that each of the elements described above, or two or more together, may also find a useful application in other types of apparatus differing from the types described above.

While the invention has been illustrated and described as embodied in a movie camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features, that from the standpoint of prior art, fairly constitute essential characteristics of the generic or specific aspects of this invention.

What is claimed as new and desired to be protected by Letters Patent is set forth in the appended claims:

1. A movie camera comprising: a film-advance motor; a source of electricity; switch means between said source and said motor closable for connecting same together to operate said motor and openable for disconnecting same to stop said motor; a diaphragm having an aperture of variable size; fade means connected to said diaphragm for slowly closing same for fade out and for slowly opening same for fade in; and circuit means connected between said fade means and said switch means for detecting the aperture size and opening said switch means when said aperture being closed after fade out, wherein said fade means includes a driving coil connected to said diaphragm for opening and closing same, said circuit means including a damping coil adjacent said drive coil and capable of generating a voltage.

2. The camera defined in claim 1 wherein said damping coil is so adapted and arranged that the voltage in it is counter the voltage on said drive coil.

3. The camera defined in claim 2, further comprising aperture-adjustment means including a photosensitive element behind said diaphragm and means for automatically setting said diaphragm in accordance with the light detected by said element.

4. The camera defined in claim 3, wherein said circuit means includes a differential amplifier having one input connected to said photosensitive element and another input connected to said damping coil.

5. The camera defined in claim 4, wherein said adjustment means includes a bridge circuit one of whose elements is a photoresistor constituting said photosensitive element.

6. The camera defined in claim 5, wherein said fade means includes a switch for connecting a resistor in shunt across said photoresistor.

7. The camera defined in claim 1 wherein said circuit means includes a transistor in circuit with said switch means and normally maintained conductive, said fade means operable to make said transistor non-conductive at the end of a fade out.

8. A movie camera comprising: a film-advance motor; a source of electricity; switch means between said source and said motor closable for connecting same together to operate said motor and openable for disconnecting same to stop said motor; a diaphragm having an aperture of variable size; fade means connected to said diaphragm for slowly closing same for fade out and for slowly opening same for fade in; and circuit means connected between said fade means and said switch means for detecting the aperture size and opening said switch means when said aperture being closed after fade out, wherein said fade means includes a drive coil connected to said diaphragm for opening and closing same, said circuit means including a damping coil adjacent said drive coil and capable of generating a voltage therein, said camera further comprising a photosensitive element behind said diaphragm and a differential amplifier having one input connected to said damping coil, another input connected to said element, and an output connected to said drive coil and to said switch means.

9. A movie camera comprising: a film-advance motor; a source of electricity; switch means between said source and said motor closable for connecting the same together to operate said motor and openable for disconnecting the same to stop said motor; an adjustable diaphragm; diaphragm-adjusting means comprising a drive winding; and a negative-feedback control circuit operative for generating a scene-light-dependent diaphragm error signal and operative for energizing said drive winding in dependence upon said error signal, and including fade-out selecting means operative for effecting fade-out by changing said diaphragm error signal in a sense causing said diaphragm-adjusting means to slowly close said diaphragm, said negative-feedback control circuit furthermore including a damping winding, said damping winding being so arranged relative to said drive winding and so connected in said control circuit that there is induced in said damping winding during adjusting motion of said adjusting means a damping voltage which opposes the energization of said drive winding, means operative when said adjusting means upon completion of a fade-out operation comes to a standstill for deriving a stop signal from the resultant change in at least one signal being generated by said control circuit, and means operative in response to said stop signal for opening said switch means and thereby stopping said film-advance motor.

10. A movie camera comprising: a film-advance motor; a source of electricity; switch means between said source and said motor closable for connecting the same together to operate said motor and openable for disconnecting the same to stop said motor; an adjustable diaphragm; adjusting means coupled to said diaphragm for varying the diaphragm setting; negative-feedback control means operative for generating an error signal dependent upon the difference between the actual diaphragm setting and the setting required for the prevailing scene light and operative for energizing said adjusting means to an extent dependent upon the value of said error signal; fade-out selecting means operative for effecting fade-out by changing said error signal in a sense causing said adjusting means to slowly close said diaphragm; means operative for opening said switch means and thereby stopping said film-advance motor when said error signal reaches a preselected value; and damping means operative during the performance of a fade-out for damping the operation of said adjusting means and preventing said error signal from reaching said preselected value so long as said adjusting means has not yet come to a standstill by lowering the value of said error signal to an extent dependent upon the rate at which said adjusting means closes said diaphragm.

* * * * *